United States Patent
Khalil et al.

(10) Patent No.: US 10,212,070 B2
(45) Date of Patent: Feb. 19, 2019

(54) SYSTEM AND METHOD FOR DISCOVERING THE LOCATIONS OF POTENTIAL LAYER-2 NODES IN A TELECOMMUNICATIONS NETWORK

(71) Applicant: Tata Communications (America) Inc., Herndon, VA (US)

(72) Inventors: Ahmad Najib Khalil, Red Bank, NJ (US); Mohammad Nurujjaman, Old Bridge, NJ (US); Mohammad Faisal Uddin, Matawan, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 351 days.

(21) Appl. No.: 14/867,515

(22) Filed: Sep. 28, 2015

(65) Prior Publication Data

US 2017/0093692 A1 Mar. 30, 2017

(51) Int. Cl.
*H04L 12/707* (2013.01)
*H04L 12/751* (2013.01)
(Continued)

(52) U.S. Cl.
CPC ............. *H04L 45/22* (2013.01); *H04L 41/12* (2013.01); *H04L 45/02* (2013.01); *H04L 45/66* (2013.01); *H04W 16/18* (2013.01); *H04W 64/003* (2013.01)

(58) Field of Classification Search
CPC . H04B 10/0773; H04L 12/28; H04L 41/0668; H04L 41/0803; H04L 41/0813; H04L 41/0816; H04L 41/0856; H04L 41/12; H04L 41/145; H04L 45/00; H04L 45/02; H04L 45/04; H04L 45/22;
(Continued)

(56) References Cited

U.S. PATENT DOCUMENTS

| | | |
|---|---|---|
| 2011/0085445 A1 | 4/2011 | Klincewicz et al. |
| 2013/0108263 A1 | 5/2013 | Srinivas et al. |

(Continued)

FOREIGN PATENT DOCUMENTS

WO 2008108984 A2 9/2008

OTHER PUBLICATIONS

"Extended European Search Report" issued in counterpart EP Application No. 16002086, dated Dec. 14, 2016, Published in: EP.
(Continued)

*Primary Examiner* — Jamal Javaid
*Assistant Examiner* — Rosene Clark
(74) *Attorney, Agent, or Firm* — Kaplan Breyer Schwarz, LLP

(57) ABSTRACT

A technique for discovering and identifying locations at which to deploy new Layer-2 nodes within a telecommunications network. The disclosed technique is intended to identify Layer-2 nodes at locations where they can improve service availability when deployed, especially in geographic regions that suffer frequent or simultaneous cable breaks, or both. The locations of the new Layer-2 nodes depend on the underlying Layer-0 network topology, as well as on the existing Layer-2 topology. Thus, the disclosed technique features a cross-layer approach that takes these factors into account and evaluates the locations in a way that can considerably increase the availability of one or more services offered in the telecommunications network.

17 Claims, 10 Drawing Sheets

(51) Int. Cl.
*H04L 12/721* (2013.01)
*H04W 16/18* (2009.01)
*H04W 64/00* (2009.01)
*H04L 12/24* (2006.01)

(58) Field of Classification Search
CPC ....... H04L 45/52; H04L 45/66; H04L 69/324; H04Q 2011/009; H04Q 3/0083; H04W 16/18; H04W 64/003
See application file for complete search history.

(56) References Cited

U.S. PATENT DOCUMENTS

| | | | | |
|---|---|---|---|---|
| 2013/0163465 | A1* | 6/2013 | Krishnaswamy | H04L 47/2425 370/254 |
| 2014/0126355 | A1* | 5/2014 | Filsfils | H04L 45/66 370/225 |
| 2016/0182355 | A1* | 6/2016 | Traxler | H04L 45/02 370/359 |
| 2016/0191194 | A1* | 6/2016 | Wood | H04J 14/0286 398/58 |
| 2016/0191370 | A1* | 6/2016 | Wood | H04L 45/02 370/238 |
| 2016/0191391 | A1* | 6/2016 | Wood | H04L 47/125 370/235 |

OTHER PUBLICATIONS

"Ethernet ring protection switching", G.8032/Y.1344 (Aug. 2015), XP044131234, "ITU-T Standard", dated Aug. 13, 2015, pp. 1-82, Publisher: International Telecommunication Union, Published in: CH Antonis Hadjiantonis et al., "Evolution to a Converged Layer 1, 2 in a Global-Scale, Native Ethernet Over WDM-Based Optical Networking Architecture", ISSN: 0733-8716, DOI: 10.1109/JSAC. 2007.070616, "IEEE Journal on Selected Areas in Communications", dated Jun. 1, 2007, pp. 1048-1058, XP055323461, vol. 25, No. 5, Publisher: IEEE.

* cited by examiner

US 10,212,070 B2

SYSTEM AND METHOD FOR DISCOVERING THE LOCATIONS OF POTENTIAL LAYER-2 NODES IN A TELECOMMUNICATIONS NETWORK

FIELD OF THE INVENTION

The present invention relates to telecommunications in general, and, more particularly, to discovering the locations of potential layer-2 nodes to be deployed for use in a telecommunications network.

BACKGROUND OF THE INVENTION

FIG. 1A depicts a schematic diagram of a portion of a telecommunications system in the prior art. The depicted portion includes telecommunications network 110, which comprises: layer-0 nodes 101-1 through 101-12, layer-0 route segments 102-1 through 102-17, layer-2 nodes 103-1 through 103-3, and layer-2 bundle 104-1 through 104-2. The elements within telecommunications network 110 are interrelated as shown.

Network 110 enables devices such as user endpoints to exchange data packets with one another. In particular, network 110 constitutes a wide-area network (WAN), although it could alternatively constitute a local-area network (LAN) or other type of network. Network 110 operates on Layer-2 (L-2) Provider Backbone Bridging (PBB) technology and, having one or more Ethernet rings, can be referred to as an Ethernet transport network. The connectivity among L-2 nodes, in which an L-2 connection spanning a pair of L-2 nodes is referred to as an Ethernet bundle, are routed over underlying Layer-0 (L-0) route segments, which are optical Dense Wavelength Division Multiplexing (DWDM) segments in this case. An ITU-T G.8032 ring serves as the protection mechanism at the Ethernet layer.

Layer-0 (L-0) node 101-m, wherein m can have a value equal to 1 through 12, inclusive, is a device that interconnects two or more layer-0 route segments. Each L-0 node supports DWDM.

Layer-0 (L-0) route segment 102-n, wherein n can have a value equal to 1 through 17, inclusive, refers to the physical link or medium connecting two L-0 nodes to each other. For clarity purposes, only L-0 route 102-1 is shown, although there exists an L-0 route segment 102-n between other pairs of L-0 nodes as depicted. Each L-0 route segment supports DWDM.

Layer-2 (L-2) node 103-p, wherein p can have a value equal to 1 through 3, inclusive, is a device that provides layer-2 (i.e., data link) computer networking functionality. Each L-2 node supports the Ethernet protocol. Each L-2 node comprises an L-0 node as well. As depicted, L-2 node 103-1 comprises L-0 node 101-1, L-2 node 103-2 comprises L-0 node 101-5, and L-2 node 103-3 comprises L-0 node 101-9.

Layer-2 (L-2) bundle 104-q, wherein q can have a value equal to 1 or 2, inclusive, refers to the data link that connects two L-2 nodes to each other. As depicted, L-2 bundle 104-1 connects L-2 node 103-1 and 103-2, and L-2 bundle 104-2 connects L-2 node 103-2 and 103-3. Each L-2 bundle traverses one or more L-0 route segments between the two L-2 nodes connected by L-2 bundle 104-q.

There are situations in which the data packet routing performed within telecommunications system 100 can be disrupted. For example, and as depicted in FIG. 1B, a physical link can be cut, as represented by cable break 105. As depicted, break 105 has disrupted the L-0 route segment between L-0 nodes 101-6 and 101-7 and, consequently, has disrupted the L-2 bundle between L-2 nodes 103-2 and 103-3. Depending on various factors, such disruptions can be frequent, and multiple disruptions can occur simultaneously with one another.

Therefore, what is needed is a technique for improving service availability that avoids at least some of the disadvantages in the prior art.

SUMMARY OF THE DISCLOSURE

The invention enables the discovery and identification of locations at which to deploy new Layer-2 nodes within a telecommunications network, without at least some of the disadvantages in the prior art. The disclosed technique is intended to identify Layer-2 nodes at locations where they can improve service availability when deployed, especially in geographic regions that suffer frequent or simultaneous cable breaks, or both. In accordance with the illustrative embodiment of the present disclosure, the locations of the new Layer-2 nodes depend on the underlying Layer-0 network topology, as well as on the existing Layer-2 topology. Thus, the disclosed technique features a cross-layer approach—that is, across Layer-2 and Layer-0—that takes these factors into account and evaluates the locations in a way that can considerably increase the availability of one or more services offered in the telecommunications network.

The disclosed technique receives as inputs i) a layer-0 (L-0) network topology description of L-0 nodes and L-0 links, ii) the latency and/or availability of each L-0 link, and iii) a description of the existing layer-2 (L-2) topology. Using these inputs, the technique determines and presents new locations for L-2 nodes and L-0 routes for new L-2 bundles, as well as for the existing L-2 bundles, if needed, while maximizing the L-2 service availability. Because the L-2 service availability in a network relies highly on the availability of underlying L-0 route segments, the selection of L-0 segments across all of the L-2 bundles that make up an end-to-end path along an illustrative Ethernet ring is significantly important in designing Ethernet networks. Thus, the illustrative embodiment considers the available design alternatives of these two layers (L-0 and L-2) in order to obtain an optimal solution.

The illustrative embodiment considers the available design alternatives in accordance with two salient parts of the disclosed technique. The first part of the technique includes using a heuristic algorithm that looks for better network design alternatives, by moving from one alternative layer-2 route to another and exploring all potential L-2 node locations in the network. The second part of the technique includes leveraging a linear programming model for obtaining optimal L-0 routing for a given alternative layer-2 route.

The disclosed technique is further based on the following insight made by the inventors. An illustrative Ethernet ring is comprised of a set of L-2 nodes and L-2 connectivity among those nodes. To select L-0 route segments for a first L-2 bundle of an Ethernet ring, one could choose a pair of L-2 nodes and execute an efficient routing algorithm to find the best available L-0 route for that particular pair of nodes. A similar process could be followed to obtain L-0 routes for all additional Ethernet bundles that make up the ring. Depending on the routing algorithm used, one could obtain a best possible L-0 route between a given pair of L-2 nodes.

As recognized by the inventors, however, this process of finding L-0 routes for all bundles in a sequential manner does not guarantee an optimal set of bundles to make up a ring. This is because the underlying L-0 route segments that coincide with the routes of the Ethernet (L-2) bundles within a ring have a specific requirement: the combined set of bundles must consist of completely disjoint L-0 route segments. Hence, the L-0 routings of the Ethernet bundles within a ring are not independent of one another. Thus, a combined approach of routing for all bundles within a ring is necessary in order to obtain optimal routing. As a result, the technique of the illustrative embodiment features an optimization model that is designed to obtain the L-0 routes of all Ethernet bundles that are considered in the L-2 network architecture.

The technique disclosed herein interworks with a telecommunications network that is based on Ethernet rings with underlying DWDM capability. As those who are skilled in the art will appreciate after reading this specification, however, the technique can be used in conjunction with a network that is based on a different Layer-2 or a different Layer-0, or both.

A first illustrative method comprises: receiving, by a data-processing system, i) a first description of an layer-0 network topology of a telecommunications network, comprising one or more layer-0 route segments, ii) a second description of an existing layer-2 network topology of the telecommunications network, comprising an existing layer-2 route, and iii) a first performance characteristic of the telecommunications network; generating, by the data-processing system, one or more alternatives to the existing layer-2 route, wherein each of the one or more alternatives comprises a different potential layer-2 node selected from one or more layer-0 node locations that are identified in the first description; generating, by the data-processing system, an optimal layer-0 routing for each of the one or more alternatives, according to a first objective that is based on the first performance characteristic; and routing one or more packets according to the optimal layer-0 routing for one of the one or more alternatives generated by the data-processing system.

A second illustrative method comprises: receiving, by a data-processing system, i) a first description of an layer-0 network topology of a telecommunications network, comprising one or more layer-0 route segments, ii) a second description of an existing layer-2 network topology of the telecommunications network, comprising an existing layer-2 route, and iii) a first performance characteristic of the telecommunications network; generating, by the data-processing system, i) a first non-empty set of one or more layer-0 node locations that are identified in the first description, based on a first predetermined criterion, and ii) a second non-empty set of one or more layer-0 nodes that are identified in the first description, based on a second predetermined criterion; generating, by the data-processing system, one or more alternatives to the existing layer-2 route, wherein each of the one or more alternatives comprises a unique combination of i) a potential layer-2 node selected from the one or more layer-0 node locations in the first set and ii) a potential layer-2 node selected from the one or more layer-0 node locations in the second set; generating, by the data-processing system, an optimal layer-0 routing for each of the one or more alternatives, according to a first objective that is based on the first performance characteristic; and routing one or more packets according to the optimal layer-0 routing for one of the one or more alternatives generated by the data-processing system.

A third illustrative method comprises: receiving, by a data-processing system, i) a first description of an layer-0 network topology of a telecommunications network, comprising one or more layer-0 route segments, ii) a second description of an existing layer-2 network topology of the telecommunications network, comprising an existing layer-2 route, and iii) a first performance characteristic of the telecommunications network; generating, by the data-processing system, a first non-empty set of one or more layer-0 node locations that are identified in the first description, based on a first predetermined criterion; generating, by the data-processing system, one or more alternatives to the existing layer-2 route, wherein each of the one or more alternatives comprises a different potential layer-2 node selected from the one or more layer-0 node locations in the first set; generating, by the data-processing system, an optimal layer-0 routing for each of the one or more alternatives, according to a first objective that is based on the first performance characteristic; selecting, by the data-processing system, an alternative from amongst the one or more alternatives, based on service availability of the optimal layer-0 routing of each of the one or more alternatives; and transmitting, by the data-processing system, an identification of the potential layer-2 node that corresponds to the optimal layer-0 routing for the alternative selected.

DETAILED DESCRIPTION

Layer 0—For the purposes of this specification and the claims, "layer 0" is defined as the transmission medium or media in data communication network.

Layer 2—For the purposes of this specification and the claims, "layer 2" is defined as the Data Link layer of the Open Systems Interconnection (OSI) communication model.

Route segment—For the purposes of this specification and the claims, "route segment" is defined as the transmission medium path between two layer-0 nodes, with no other layer-0 nodes in between.

Network topology—For the purposes of this specification and the claims, "network topology" is defined as the arrangement of various elements (e.g., nodes, links, etc.) of a computer network or other telecommunications network. It may be depicted physically or logically.

Bundle—For the purposes of this specification and the claims, "bundle" is defined as the layer-2 connectivity between two layer-2 nodes, with no other layer-2 nodes in between.

Layer-2 route—For the purposes of this specification and the claims, "layer-2 route" is defined as all of the bundles that constitute a path between two specified layer-2 nodes. A layer-2 route may have, but is not required to have, one or more layer-2 nodes along the path and in between the two specified nodes.

Existing layer-2 route—For the purposes of this specification and the claims, "existing layer-2 route" is defined as a layer-2 route that is in operation at the time under consideration.

Alternative layer-2 route—For the purposes of this specification and the claims, "alternative layer-2 route" is defined as a layer-2 route that is under consideration as a replacement to an existing layer-2 route.

Potential layer-2 node—For the purposes of this specification and the claims, "potential layer-2 node" is defined as a layer-2 node that is not one of existing layer-2 nodes but forms a layer-2 route being considered to be deployed to an existing network topology.

Figures 1A, 1B:
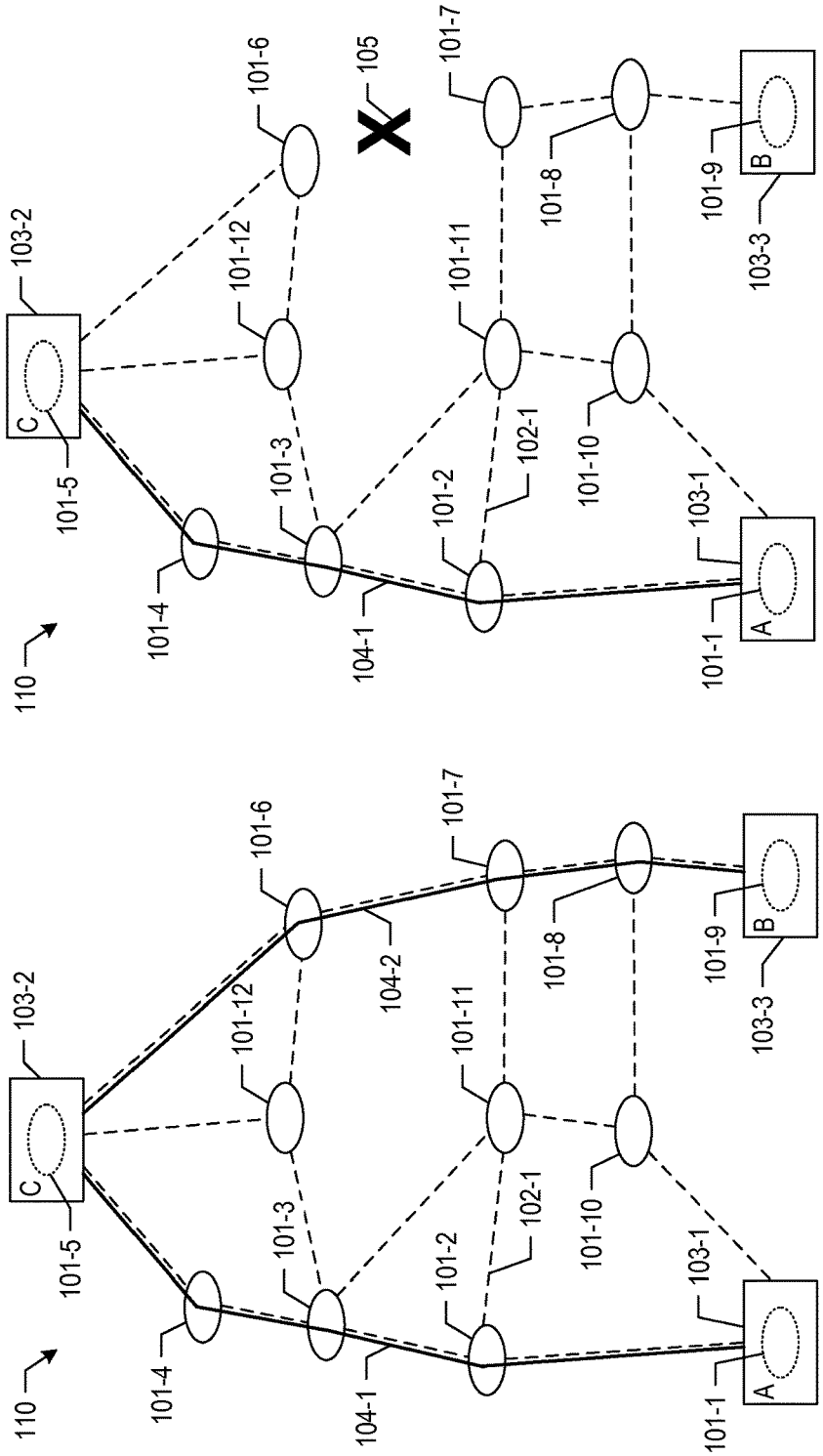
FIGS. 1A and 1B depict schematic diagrams of a portion of a telecommunications system in the prior art.
Figure 2:
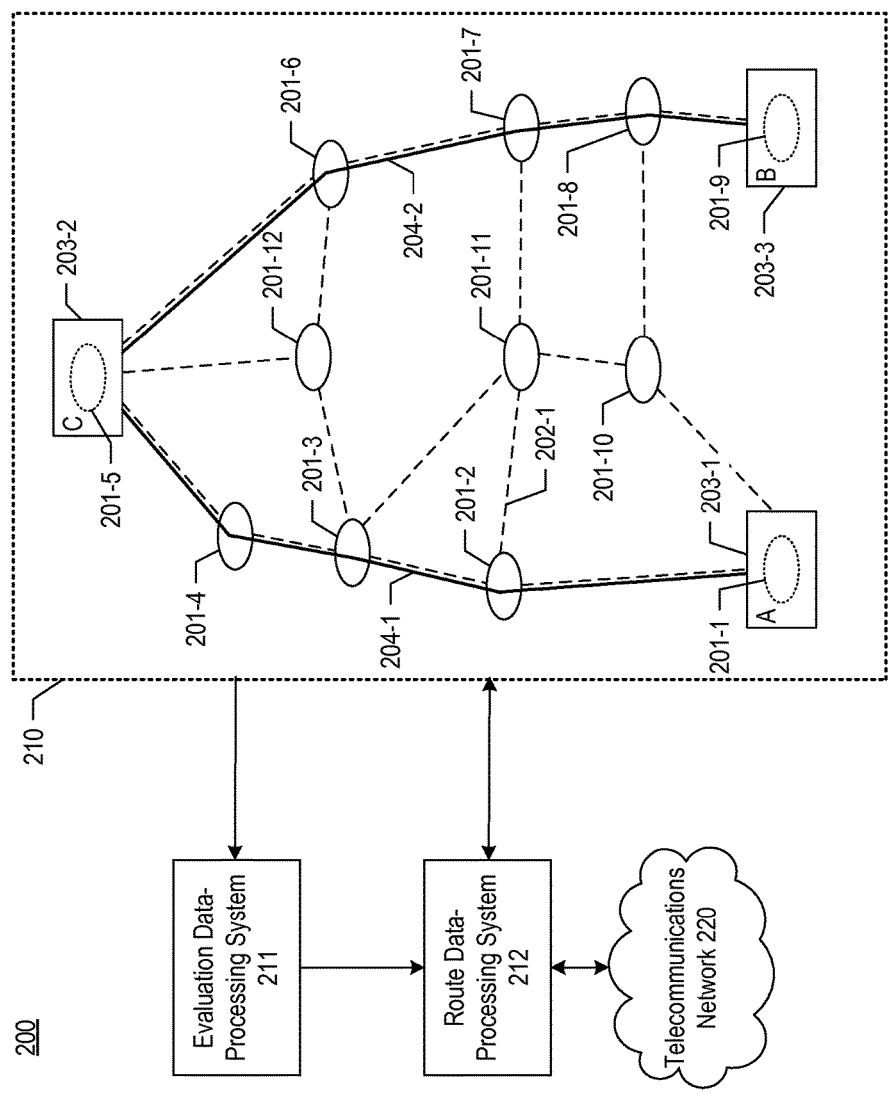
FIG. 2 depicts a schematic diagram of telecommunications system 200 in accordance with the illustrative embodiment of the present disclosure.

FIG. 2 depicts a schematic diagram of telecommunications system 200 in accordance with the illustrative embodiment of the present disclosure. Telecommunications system 200 comprises telecommunications networks 210 and 220, evaluating data-processing system 211, and routing data-processing system 212, interrelated as shown.

Telecommunications network 210 comprises: layer-0 nodes 201-1 through 201-M, layer-0 route segments 202-1 through 202-N, layer-2 nodes 203-1 through 203-P, and layer-2 bundle 204-1 through 204-Q, interrelated as shown. As depicted, the integers M, N, P, and Q have values that are equal to 12, 17, 3, and 2, respectively. These integers, however, can have other values than depicted, as those who are skilled in the art will appreciate after reading this specification.

Network 210 enables devices such as user endpoints to exchange data packets with one another. In particular, network 210 constitutes a wide-area network (WAN), although in some other embodiments of the present disclosure, network 210 can constitute a local-area network (LAN) or other type of network. Network 210 operates on Layer-2 (L-2) Provider Backbone Bridging (PBB) technology and, having one or more Ethernet rings, can be referred to as an Ethernet transport network. The connectivity among L-2 nodes, in which an L-2 connection spanning a pair of L-2 nodes is referred to as an Ethernet bundle, are routed over underlying Layer-0 (L-0) route segments, which are optical Dense Wavelength Division Multiplexing (DWDM) segments in this case. An ITU-T G.8032 ring serves as the protection mechanism at the Ethernet layer.

Layer-0 (L-0) node 201-$m$, wherein m can have a value equal to 1 through M, inclusive, is a device that interconnects two or more layer-0 route segments. Each L-0 node supports DWDM.

Layer-0 (L-0) route segment 202-$n$, wherein n can have a value equal to 1 through N, inclusive, refers to the physical link or medium connecting two L-0 nodes to each other. For clarity purposes, only L-0 route 202-1 is shown, although there exists an L-0 route segment 202-$n$ between other pairs of L-0 nodes as depicted. Each L-0 route segment supports DWDM.

Layer-2 (L-2) node 203-$p$, wherein p can have a value equal to 1 through P, inclusive, is a device that provides layer-2 (i.e., data link) computer networking functionality. Each L-2 node supports the Ethernet protocol and is an Ethernet point-of-presence (PoP), in some embodiments. Each L-2 node comprises an L-0 node as well. As depicted, L-2 node 203-1 comprises L-0 node 201-1, L-2 node 203-2 comprises L-0 node 201-5, and L-2 node 203-3 comprises L-0 node 201-9.

Layer-2 (L-2) bundle 204-$q$, wherein q can have a value equal to 1 through Q, inclusive, refers to the data link that connects two L-2 nodes to each other. As depicted, L-2 bundle 204-1 connects L-2 node 203-1 and 203-2, and L-2 bundle 204-2 connects L-2 node 203-2 and 203-3. Each L-2 bundle traverses one or more L-0 route segments between the two L-2 nodes connected by L-2 bundle 204-$q$. A series of multiple layer-2 nodes and bundles constitute a ring structure in network 210, such as nodes 203-1 through 203-3 with associated bundles 204-1 and 204-2.

Telecommunications network 210 is characterized as having a ring network topology. One of ordinary skill in the art will recognize, however, that the network can have a structure other than that of a single ring. Thus, in one or more other embodiments, network 210 can have a dual-ring structure, a mesh structure, a fully connected structure, or any other suitable structure. Furthermore, in other embodiments of the present disclosure, network 210 can operate on a traffic engineering technology different than PBB, can be based on a protocol different than Ethernet, can have protection switching other than ITU-T G.8032, and/or can utilize multiplexing other than DWDM.

Evaluation data-processing system 211 is a server computer that is configured to perform at least some of the operations discussed below and in FIG. 5. System 211 receives information related to network topology of network 210 and other relevant information, such as layer-0 topology, existing layer-2 topology, latency, and measured availability of layer-0 route segments. Based on these and other data, system 211 discovers the location of one or more potential layer-2 nodes for future use in network 210. In some other embodiments of the present disclosure, system 211 can be based on a different computing platform.

Evaluation data-processing system 211 can obtain the information related to network 210 from one or more sources. For example and without limitation, system 211 can receive the information via i) control paths from one or more nodes and/or links in network 210, and/or ii) data entry performed by a technician. In regard to reporting the locations of the one or more potential layer-2 nodes, system 211 can present the results to a technician (e.g., via a display, etc.) and/or can provide the results to route data-processing system 212 for further processing.

Route data-processing system 212 is a server computer that is configured to perform routing of one or more packets through at least a portion of network 210. System 212 receives, from system 211, updated information related to network 210, including updated layer-2 topology, and provides an updated description of the layer-2 topology to one or more nodes in network 210, which is then used to route one or more packets. In some embodiments of the present disclosure, evaluation data-processing system 211 provides the updated description of the layer-2 topology to network 210, which is then used to route one or more packets, instead of system 212 providing the updated description.

System 212, in some embodiments of the present disclosure, can also receive one or more packets from telecommunications network 220. Then, based on the updated layer-2 topology that is generated by evaluation data-processing system 211, can select a proper route through network 210 for each packet or stream of packets received.

As depicted, route data-processing system 212 is physically distinct from evaluation data-processing system 211. However, as those who are skilled in the art will appreciate after reading this specification, the operations performed by systems 211 and 212 can be performed within the same data-processing system (e.g., server computer, etc.). Although system 212 is a server computer in some embodiments, system 212 in other embodiments can be based on different computing platform.

Figure 3:
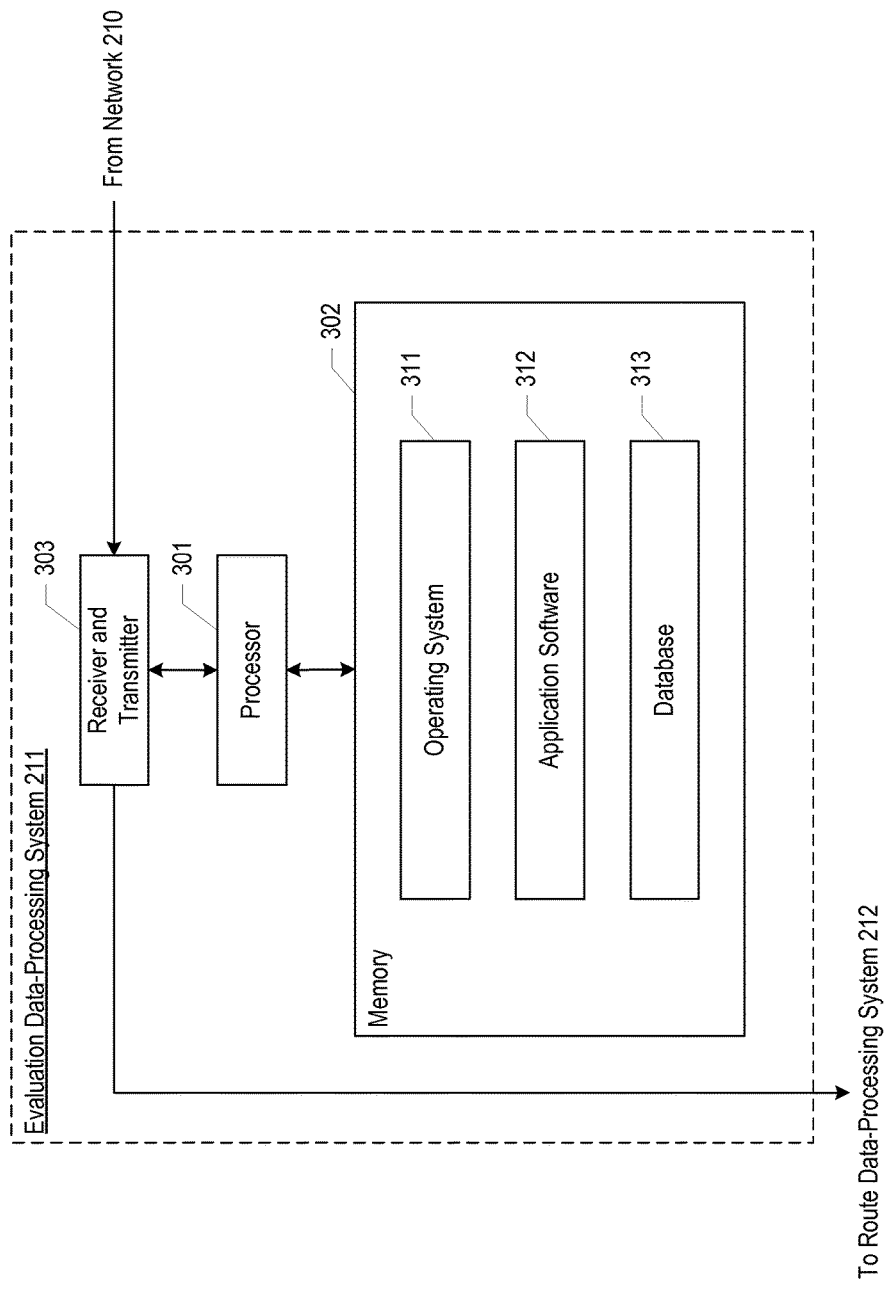
FIG. 3 depicts a schematic diagram of evaluation data-processing system 211, in accordance with the illustrative embodiment of the present disclosure.

FIG. 3 depicts a schematic diagram of evaluation data-processing system 211, in accordance with the illustrative embodiment of the present disclosure. System 211 can be implemented in hardware, software, or a combination of hardware and software. Although system 211 is depicted as a single server computer, software components of the functionality disclosed herein can reside in multiple server computers, or in one or more like computing devices or machines, for that matter. The server computers or like computing devices or machines can comprise one or more central processing units (processors) and one or more memory devices. The structure and function of such server computers and the like are well known to those skilled in the art.

In accordance with the illustrative embodiment of the present disclosure, system 211 comprises: processor 301, memory 302, and receiver and transmitter 303, which are interconnected as shown. In accordance with the illustrative embodiment of the present disclosure, system 211 is a server computer. As those who are skilled in the art will appreciate after reading this specification, however, system 211 can be a different type of data-processing system.

Processor 301 is a general-purpose processor that is configured to execute an operating system and the application software that performs the operations described herein, including at least some of the operations described in FIGS. 4 through 8. It will be clear to those skilled in the art how to make and use processor 301.

Memory 302 is non-transitory and non-volatile computer storage memory technology that is well known in the art (e.g., flash memory, etc.). Memory 302 is configured to store operating system 311, application software 312, and database 313. The operating system is a collection of software that manages, in well-known fashion, system 211's hardware resources and provides common services for computer programs, such as those that constitute the application software. The application software that is executed by processor 301 enables system 211 to perform the functions disclosed herein. Database 313 comprises information related to network topology of network 210 and other relevant information, such as layer-0 topology, existing layer-2 topology, latency, and measured availability of layer-0 route segments. It will be clear to those skilled in the art how to make and use memory 302.

Receiver and transmitter 303 is configured to enable system 211 to receive from and transmit to other elements within telecommunications system 200, including route data-processing system 212, telecommunications network 210, and telecommunications network 220, for example and without limitation. It will be clear to those skilled in the art how to make and use receiver and transmitter 303.

FIGS. 4 through 8 depict flowcharts of the salient operations performed in accordance with the illustrative embodiment of the present disclosure. It will be clear to those having ordinary skill in the art, after reading the present disclosure, how to make and use alternative embodiments of the disclosed methods wherein the recited operations sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

Figure 4:
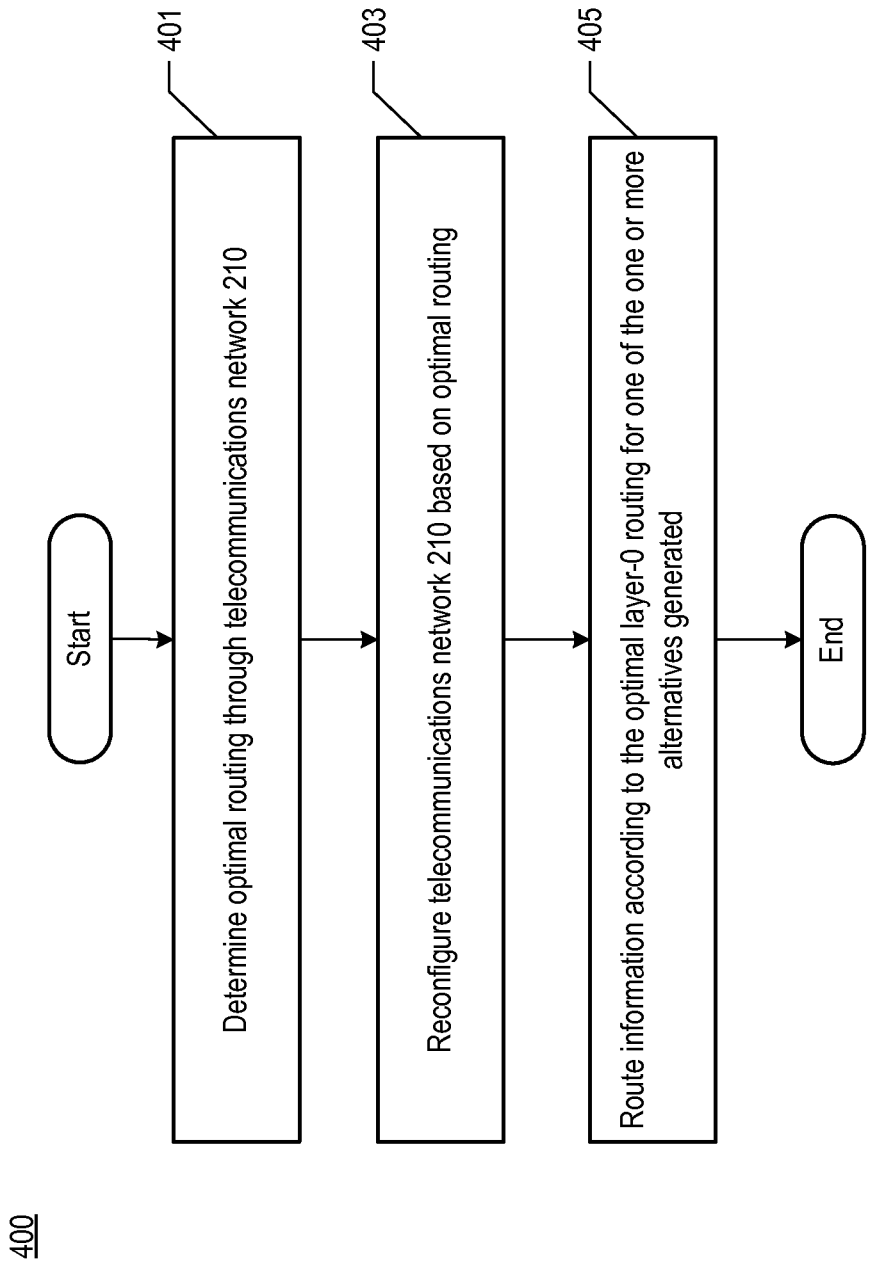
FIG. 4 depicts a flowchart of method 400, which comprises the salient operations performed in accordance with the illustrative embodiment of the present disclosure.

FIG. 4 depicts a flowchart of method 400, which comprises the salient operations performed in accordance with the illustrative embodiment of the present disclosure. These operations are performed by one or more data-processing systems within telecommunications system 200.

In accordance with operation 401, evaluation data-processing system 211 determines an optimal routing through telecommunications network 210. Operation 401 is described below and with reference to FIG. 5.

In accordance with operation 403, telecommunications network 210 is reconfigured based on the results determined in accordance with operation 401. In some embodiments of the present disclosure, some or all of operation 403 are performed by a technician.

In accordance with operation 405, route data-processing system 212 routes information pertaining to a communications service (e.g., video, voice, audio, data, telephony, etc.), in accordance with the optimal routing for one alternative of the one or more alternatives generated as described below and with reference to FIG. 5. For example and without limitation, the information routed can be that which is transmitted between two or more parties during a telephone call. In accordance with the illustrative embodiment, the information routed is in the form of packets, while in some other embodiments the information can be in the form of other types of units.

As depicted, operations 401 through 405 are performed once. However, as those who are skilled in the art will appreciated after reading this specification, the operations depicted can be performed repeatedly (e.g., periodically, sporadically, etc.). The operations can be performed proactively (e.g., before a degradation in service availability or other performance occurs, etc.) and/or reactively (e.g., as a result of a degradation in service availability or other performance occurring, etc.).

Figure 5:
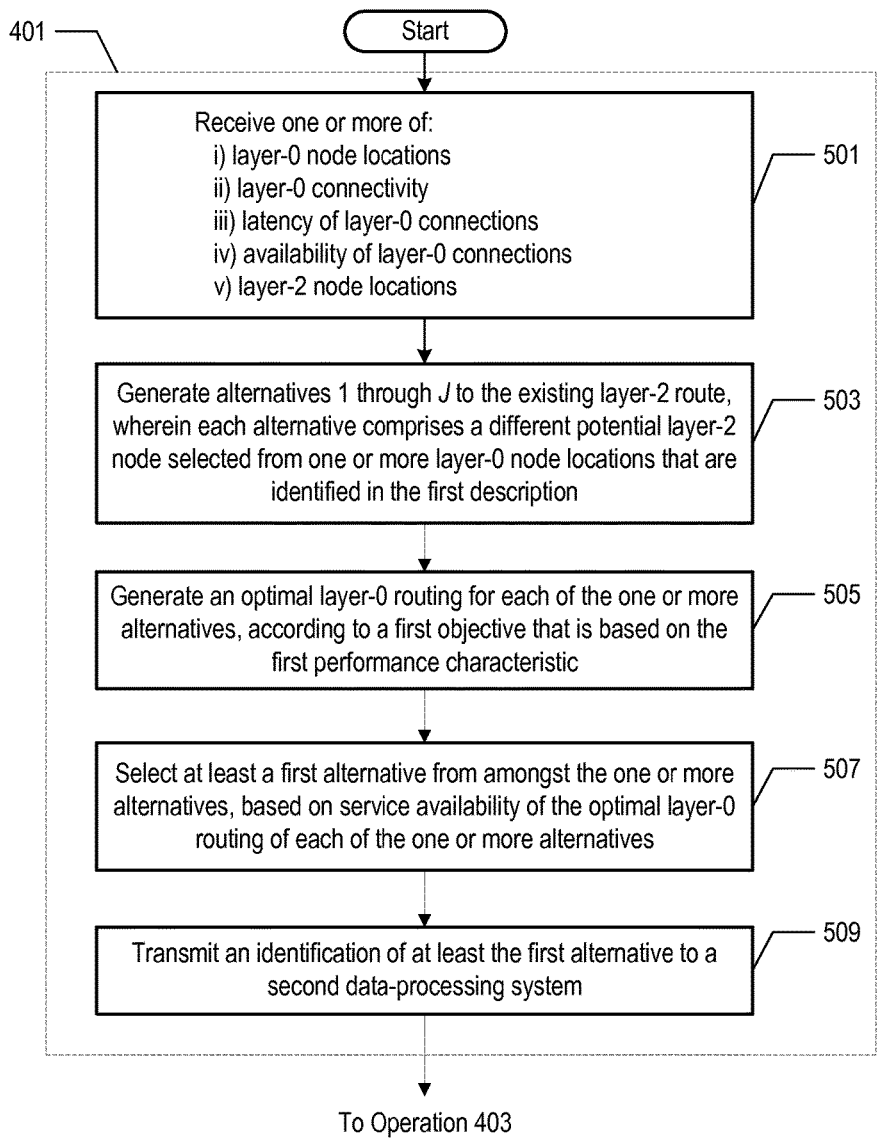
FIG. 5 depicts a flowchart of the salient sub-operations of operation 401.

FIG. 5 depicts a flowchart of the salient sub-operations of operation 401, for discovering the locations of potential layer-2 nodes in network 210. In accordance with operation 501, evaluation data-processing system 211 receives one or more of i) a first description of an layer-0 network topology of telecommunications network 210, comprising one or more layer-0 route segments including route segment 202-1, ii) a second description of an existing layer-2 network topology of network 210, comprising an existing layer-2 route that is defined by bundles 204-1 and 204-2, and iii) one or more performance characteristics of network 210. Operation 501 is described in detail below and with reference to FIG. 6.

In accordance with operation 503, system 211 generates one or more alternatives to the existing layer-2 route. Each alternative layer-2 route comprises a different potential layer-2 node selected from one or more layer-0 node locations that are identified in the first description received in accordance with operation 501. Operation 503 is described in detail below and with reference to FIG. 7.

In accordance with operation 505, system 211 generates an optimal layer-0 routing for each of the one or more alternatives generated in accordance with operation 503, according to at least a first objective that is based on the first performance characteristic received in accordance with operation 501. Operation 505 is described in detail below and with reference to FIG. 8.

In accordance with operation 507, system 211 selects at least a first alternative from amongst the one or more alternatives, based on the service availability of the optimal layer-0 routing generated in accordance with operation 505 of each of the one or more alternatives. In some embodiments of the present disclosure, system 211 can select at least a first alternative based on i) an objective to maximize the maximum service availability among all services in the current network setting and/or ii) an objective to maximize the minimum service availability among all services in the current network setting, as described later.

In accordance with operation 509, system 211 transmits an identification (e.g., layer-2 node location or locations, etc.) of at least the first alternative to a second data-processing system such as route data-processing system 212, for example and without limitation. In some other embodiments of the present disclosure, system 211 presents (e.g., displays, etc.) the identification to a technician, who can then use the information to reconfigure network 210 by adding the one or more layer-2 nodes identified.

Figure 6:
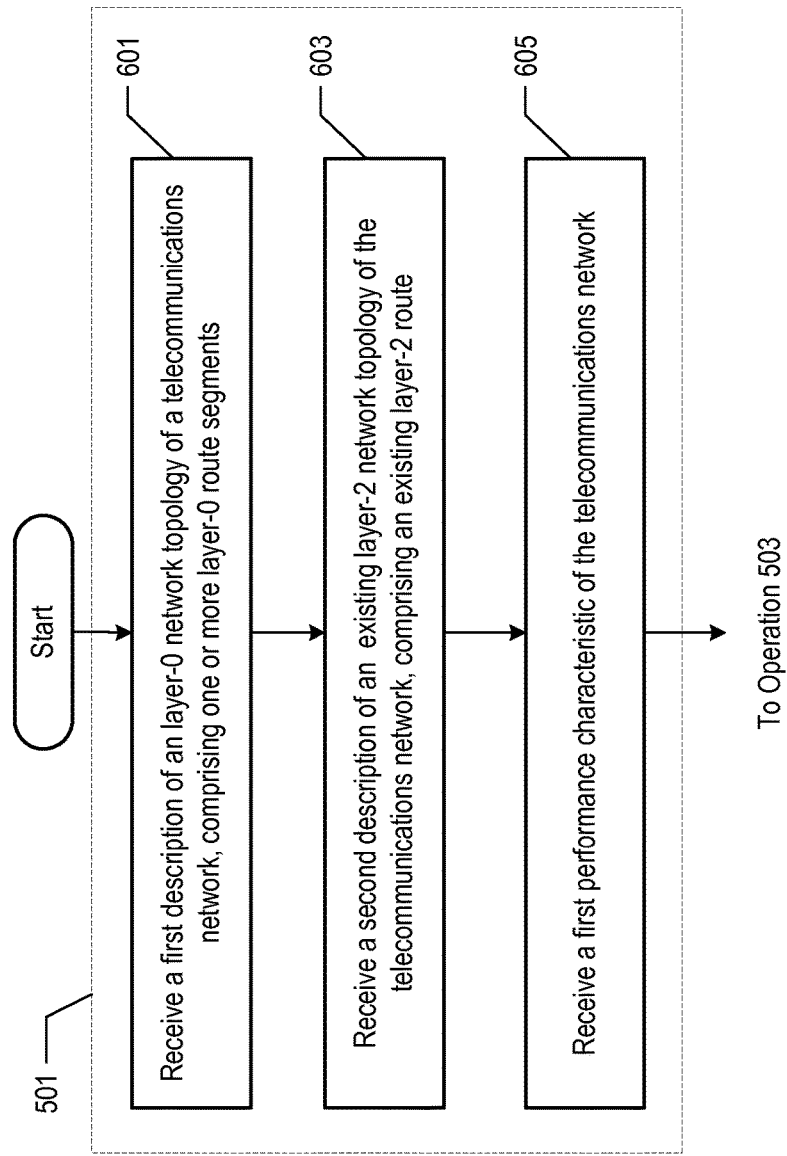
FIG. 6 depicts a flowchart of the salient sub-operations of operation 501.

FIG. 6 depicts a flowchart of the salient sub-operations of operation 501. In accordance with operation 601, evaluation data-processing system 211 receives the description of the layer-0 network topology of telecommunications network 210, comprising the one or more layer-0 route segments, including route segment 202-1 and others.

In accordance with operation 603, system 211 receives the description of the existing layer-2 network topology of network 210, comprising the existing layer-2 route that is defined by bundles 204-1 and 204-2.

In accordance with operation 605, system receives the one or more performance characteristics of network 210, including a first performance characteristic. The one or more performance characteristics can be related to latency, availability, and so on, for example and without limitation.

Figure 7:
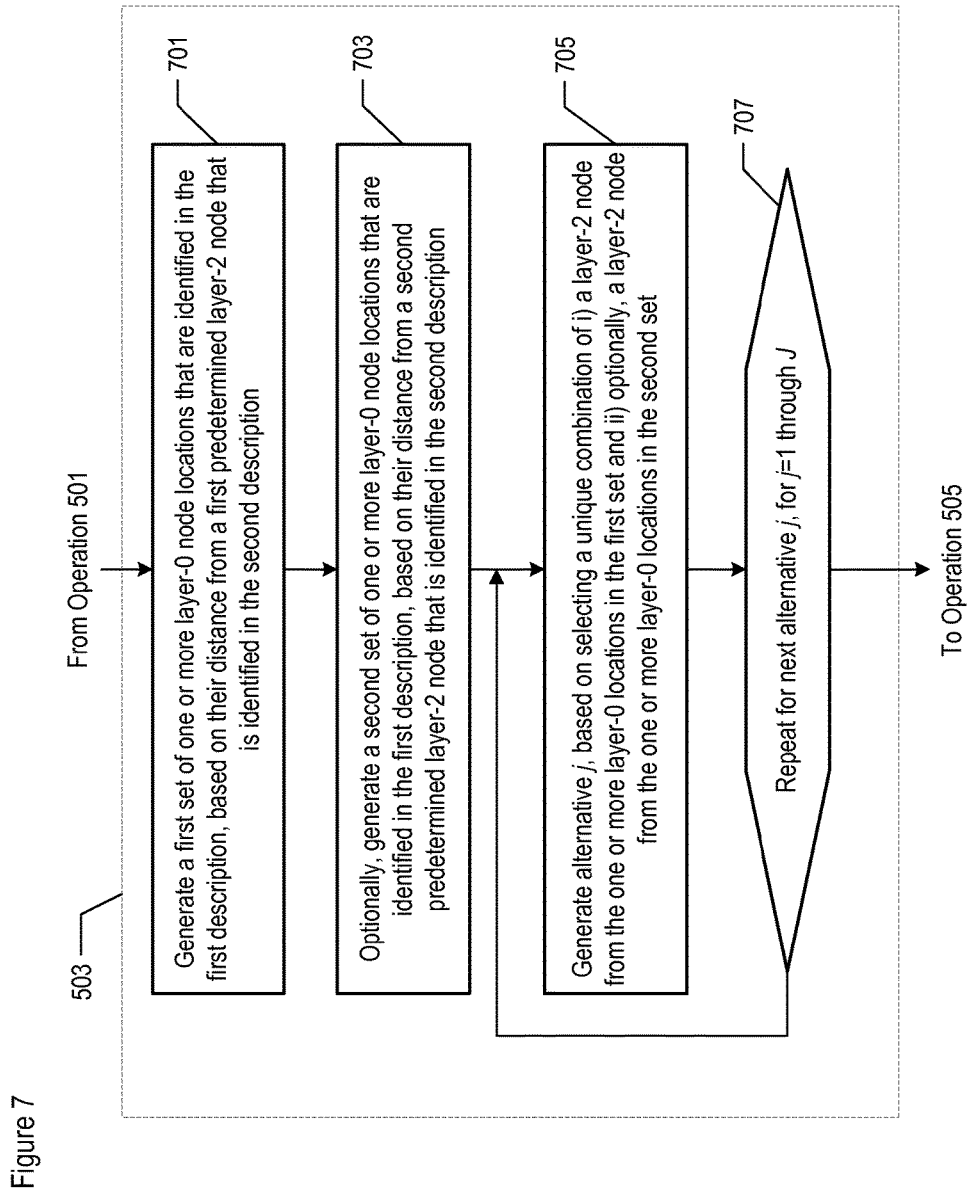
FIG. 7 depicts a flowchart of the salient sub-operations of operation 503.

FIG. 7 depicts a flowchart of the salient sub-operations of operation 503. An overview of the operations depicted in FIG. 7 is provided here. In accordance with the illustrative embodiment of the present disclosure, evaluation data-processing system 211 uses a heuristic algorithm that evaluates all alternative layer-2 nodes, concurrent with considering layer-0 routing alternatives for each layer-2 alternative. Initially, all layer-0 nodes are considered as potential new layer-2 locations. In some embodiments of the present disclosure, however, the heuristic removes from consideration one or more layer-0 nodes, in accordance with operations 701 and 703 and based on one or more criteria such as i) their proximity to existing layer-2 locations, or ii) a given minimum distance as measured from existing layer-2 locations. This approach can keep the heuristics search space manageable by eliminating nodes that have a low probability of being selected as new layer-2 node locations.

The heuristic then generates one or more alternative layer-2 routes in accordance with operation 705, with the selected layer-0 nodes serving as potential layer-2 nodes in various combinations within each alternative. Each alternative is evaluated in an iteration in which the heuristic refers to a program that solves a linear program model and obtains the optimal layer-0 routing for that alternative, as described in detail below and in reference to FIG. 8. In accordance with the illustrative embodiment of the present disclosure, the heuristic considers a set of services (e.g., voice, video, data, high-quality audio, etc.) between the end layer-2 nodes of an existing ring (e.g., nodes 203-1 and 203-3, etc.) and computes the availability of each service in a new design option. The heuristic continues to look for a better solution according to an objective function.

In some embodiments of the present disclosure, the heuristic can use two objective functions. As a result, system 211 can produce multiple alternative solutions. A first objective can be to maximize the maximum service availability among all services in the current network setting. The use of this objective can ensure that there exists at least one service that is as maximally available as possible. A second objective can be to maximize the minimum service availability among all services in the current network setting. The use of this objective can provide fairness to all of the services by ensuring that there is no service with an unacceptably low availability. As those who are skilled in the art will appreciate after reading this specification, any other appropriate objective can be accommodated in the heuristic.

In accordance with operation 701, evaluation data-processing system 211 generates a first non-empty set (e.g., a list, etc.) of one or more layer-0 node locations that are identified in the first description received earlier, based on a first predetermined criterion. The terms "node location(s)" and "distance(s) between nodes" are used in this specification within the context of network topology and are to be understood within that context. The purpose of this is to keep the heuristics search space manageable by eliminating nodes that have a low probability of being selected as new layer-2 node locations. In accordance with the illustrative embodiment, the first criterion is based on the distances of the one or more layer-0 node locations from a first predetermined layer-2 node (e.g., node 203-1, node 203-2, node 203-3, etc.) identified in the second description received earlier. In various embodiments of the present disclosure, the first criterion can be based whether the one or more layer-0 node locations are i) within a predetermined distance from the first layer-2 node (e.g., node 203-1, node 203-2, node 203-3, etc.) identified in the second description received earlier, ii) at least a predetermined distance from the first layer-2 node, and/or iii) within a predetermined range of distances from the first layer-2 node. As those who are skilled in the art will appreciate after reading this specification, other criteria can be used.

In accordance with operation 703, system 211 optionally generates a second non-empty set (e.g., a list, etc.) of one or more layer-0 nodes that are identified in the first description received earlier, based on a second predetermined criterion. The purpose of this is to keep the heuristics search space manageable by eliminating nodes that have a low probability of being selected as new layer-2 node locations. In accordance with the illustrative embodiment, the second criterion is based on the distances of the one or more layer-0 node locations from a second predetermined layer-2 node (e.g., node 203-1, node 203-2, node 203-3, etc.) that is identified in the second description received earlier, and different than the first predetermined node referred to in operation 701. In some embodiments of the present disclosure, the second criterion can be based whether the one or more layer-0 node locations are within a predetermined distance from the second layer-2 node. As those who are skilled in the art will appreciate after reading this specification, other criteria can be used.

In accordance with operation 705, generates an alternative layer-2 route j (i.e., "alternative j"). In accordance with the illustrative embodiment of the present disclosure, system 211 generates the alternative based on selecting, as part of a unique combination, i) a potential layer-2 node from the one or more layer-0 locations in the first set generated in accordance with operation 701 and, ii) optionally, a potential layer-2 node from the one or more layer-0 locations in the second set generated in accordance with operation 703. In some embodiments of the present disclosure, system 211 can select one or more additional, potential layer-2 nodes to be part of the unique combination.

In accordance with operation 707, system 211 repeats operation 707 for J unique combinations (e.g., all unique combinations, etc.) of potential layer-2 nodes, thereby generating J alternative layer-2 routes. Afterwards, control of task execution proceeds to operation 505.

Figure 8:
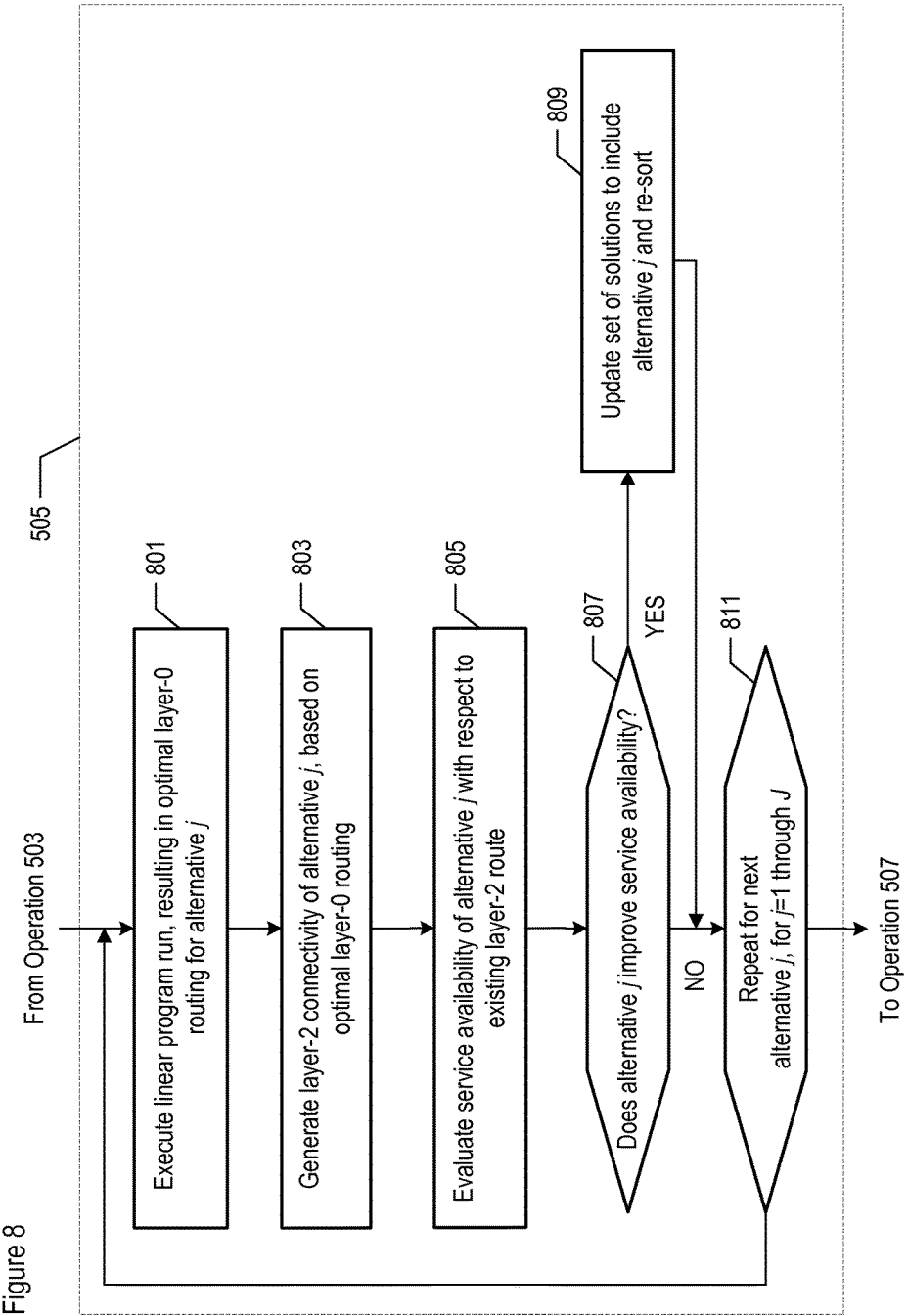
FIG. 8 depicts a flowchart of the salient sub-operations of operation 505.

FIG. 8 depicts a flowchart of the salient sub-operations of operation 505. In accordance with operation 801, evaluation data-processing system 211 executes a linear program model, resulting in an optimal layer-0 routing for layer-2 alternative j that is currently under consideration. As depicted, operation 801 will be executed for all J alternatives generated earlier.

In accordance with the illustrative embodiment of the present disclosure, system 211 uses a linear program solver (i.e., CPLEX 12.2 solver). An important part of the linear program (LP) model being used is the objective function that governs the model. In accordance with the illustrative embodiment, system 211 uses two objective functions for the LP in order to expand the solution space in layer-0, which ultimately increases the alternatives available at layer-2. Any number of objective functions can be used, however. Also, any suitable objective function can be added into the LP, as those who are skilled in the art will appreciate, in order to expand the solution space further and provide alternative routing options that can be used to form more alternative layer-2 routes.

The first objective that system 211 uses is to minimize the overall latency. By using this objective function, system 211 obtains the set of layer-0 routes with smallest latency for all bundles of a given alternative layer-2 route. However, because the difference in latency between layer-0 route segments in a telecommunications network (e.g., a regional network, etc.) might be small, in some embodiments a layer-2 route can include, in the solution space, some layer-0 segments with higher availability, even if the latency is not the most optimal. Hence, system 211 can use a second objective function that maximizes the overall layer-0 availability, even if it means adding an acceptable amount of latency.

Computing the availability $A_s$ of a series of K layer-0 route segments ($A_s=A_1*A_2*\ldots*A_K$) for an Ethernet bundle can introduce non-linearity, however, thereby making the problem unsolvable to optimality. As a result, and in some embodiments of the present disclosure, the original non-linear availability equation can be replaced with a linear equation ($A_s=\Sigma_{i=1}^{K}Ui$) that can estimate the availability of a series of layer-0 route segments, where $U_i$ refers to the "unavailability" of each layer-0 route segment. An approximation of the unavailability of each layer-0 route segment, expressed as a percentage, can be computed from the measured availability of that route segment, by subtracting from 100% the availability expressed as a percentage. Thus, the second objective function minimizes the overall "unavailability" of the set of layer-0 routes for a given alternative layer-2 route.

As described in the overview above, the illustrative embodiment generates an optimal layer-0 routing for each given alternative layer-2 route, based on a linear program that uses one or more objectives set forth herein. However, as those who are skilled in the art will appreciate after reading the present disclosure, alternative embodiments of the present disclosure can be made and used wherein the objective or objectives are different than disclosed herein. Likewise, it will be clear to those having ordinary skill in the art, after reading the present disclosure, how to make and use alternative embodiments that generates an optimal layer-0 routing by using something other than a linear programming technique.

In accordance with operation 803, system 211 generates a description of the corresponding layer-2 connectivity of the alternative j, based on the optimal layer-0 routing generated in accordance with operation 801.

In accordance with operation 805, system 211 evaluates the service availability of the alternative j with respect to the existing layer-2 route.

In accordance with operation 807, control of task execution proceeds to operation 809 if alternative j is shown to improve service availability based on the evaluation performed in accordance with operation 805. Otherwise, control of task execution proceeds to operation 811.

In accordance with operation 809, system 211 updates the set (e.g., list, etc.) of solutions to include alternative j and re-sorts the set.

In accordance with operation 811, control of task execution proceeds to operation 801 until all J alternatives have been considered. Then, control of task execution proceeds to operation 507.

Figure 9:
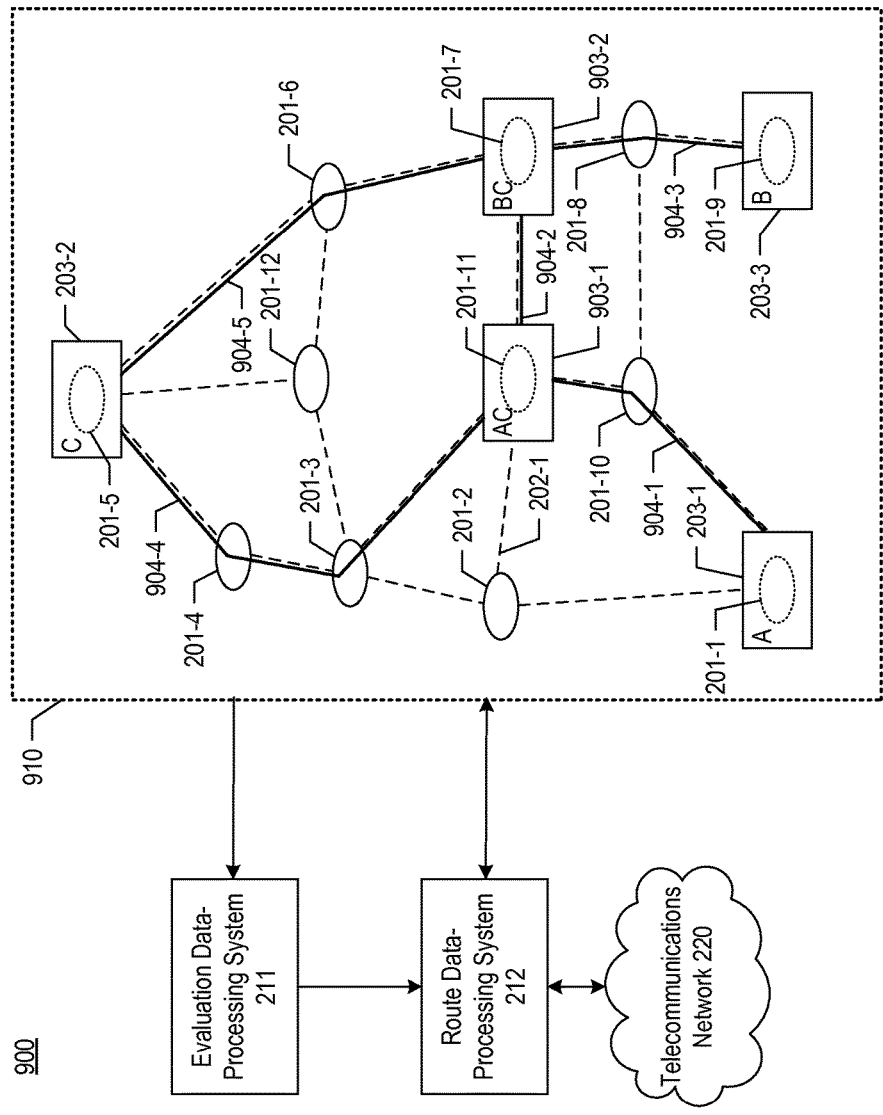
FIG. 9 depicts a schematic diagram of telecommunications system 900 in accordance with the illustrative embodiment of the present disclosure.

FIG. 9 depicts a schematic diagram of telecommunications system 900 in accordance with the illustrative embodiment of the present disclosure. Telecommunications system 900 comprises telecommunications networks 910 and 220, evaluation data-processing system 211, and route data-processing system 212, interrelated as shown. Network 910 is a modified version of network 210, in that two layer-2 nodes—that is, nodes 903-1 and 903-2—have been added as a result of system 211 performing one or more of the operations described above and with reference to FIGS. 5 through 8. Notably, the topology reflected in FIG. 9 might reflect an optimal layer-0 routing generated in accordance with operation 505.

Network 910 comprises two Ethernet rings: one is defined by nodes 203-1, 903-1, 903-2, and 203-3 that are interconnected by bundles 904-1 through 904-3, and the other is defined by nodes 903-1, 903-2, and 203-2 that are interconnected by bundles 904-2, 904-4, and 904-5. As a result of having two rings, instead of a single ring, network 910 is characterized as having an improved level of service availability when compared to network 210. This improved service availability is enabled by the evaluation that is performed in accordance with the operations described earlier.

Figure 10:
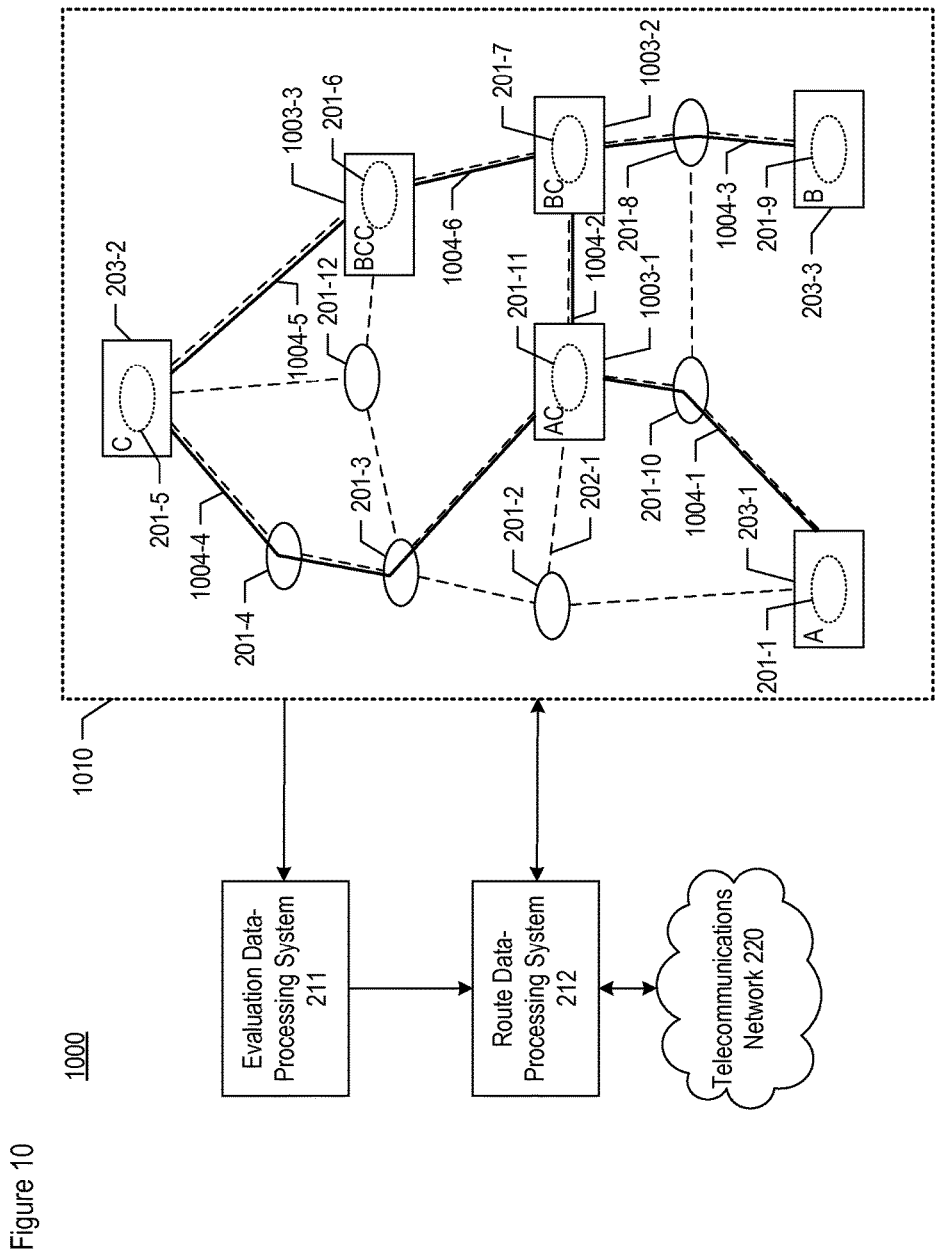
FIG. 10 depicts a schematic diagram of telecommunications system 1000 in accordance with the illustrative embodiment of the present disclosure.

FIG. 10 depicts a schematic diagram of telecommunications system 1000 in accordance with the illustrative embodiment of the present disclosure. Telecommunications system 1000 comprises telecommunications networks 1010 and 220, evaluation data-processing system 211, and route data-processing system 212, interrelated as shown. Network 1010 is a modified version of network 210, in that three layer-2 nodes—that is, nodes 1003-1, 1003-2, and 1003-3—have been added as a result of system 211 performing one or more of the operations described above and with reference to FIGS. 5 through 8. Notably, the topology reflected in FIG. 10 might reflect an optimal layer-0 routing generated in accordance with operation 505.

Network 1010 comprises two Ethernet rings: one is defined by nodes 203-1, 1003-1, 1003-2, and 203-3 that are interconnected by bundles 1004-1 through 1004-3, and the other is defined by nodes 1003-1, 1003-2, 1003-3, and 203-2 that are interconnected by bundles 1004-2 and 1004-4 through 1004-6. As a result of having two rings, instead of a single ring, network 1010 is characterized as having an improved level of service availability when compared to network 210. This improved service availability is enabled by the evaluation that is performed in accordance with the operations described earlier.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by a data-processing system,
   i) a first description of a layer-0 network topology of a telecommunications network, comprising one or more layer-0 route segments,
   ii) a second description of an existing layer-2 network topology of the telecommunications network, comprising an existing layer-2 route, and
   iii) a first performance characteristic of the telecommunications network;
   generating a first non-empty set of one or more layer-0 node locations that are identified in the first description;
   removing, by the data-processing system, one or more layer-0 node locations from the first non-empty set of one or more layer-0 node locations based on a distance of a layer-0 node location to a layer-2 node location identified in the second description to generate a second non-empty set of one or more layer-0 node locations;
   generating, by the data-processing system, one or more alternatives to the existing layer-2 route, wherein each of the one or more alternatives comprises a different potential layer-2 node selected from one or more layer-0 node locations in the second non-empty set of one or more layer-0 node locations;
   generating, by the data-processing system, an optimal layer-0 routing for each of the one or more alternatives, according to a first objective that is based on the first performance characteristic; and
   routing one or more packets according to the optimal layer-0 routing for one of the one or more alternatives generated by the data-processing system.

2. The method of claim 1 wherein the generating of the one or more alternatives further comprises selecting a layer-2 node from the one or more layer-0 locations in the second non-empty set.

3. The method of claim 1 wherein the first performance characteristic considers latency through at least some of the one or more layer-0 route segments, wherein the first objective is to minimize overall latency through a given alternative of the one or more alternatives.

4. The method of claim 3 wherein the generating of the optimal layer-0 routing for each of the one or more alternatives is also in accordance with a second objective that is based on a second performance characteristic, wherein the second performance characteristic considers unavailability through at least some of the one or more layer-0 route segments, wherein the second objective is to minimize overall unavailability through a given alternative of the one or more alternatives.

5. The method of claim 1 wherein the first performance characteristic considers unavailability through at least some of the one or more layer-0 route segments, wherein the first objective is to minimize overall unavailability through a given alternative of the one or more alternatives.

6. The method of claim 1 wherein the generating of the one or more alternatives to the existing layer-2 route is based on a plurality of services provided across the existing layer-2 route, wherein each of the one or more alternatives is based on service availability for each service in the plurality of services.

7. The method of claim 1 further comprising selecting an alternative from amongst the one or more alternatives, based on service availability of the optimal layer-0 routing of each of the one or more alternatives, wherein the routing is in accordance with the alternative selected.

8. The method of claim 7 further comprising, by the data-processing system, transmitting an identification of the potential layer-2 node that corresponds to the optimal layer-0 routing for the alternative.

9. A method comprising: receiving, by a data-processing system,
   i) a first description of a layer-0 network topology of a telecommunications network, comprising one or more layer-0 route segments,
   ii) a second description of an existing layer-2 network topology of the telecommunications network, comprising an existing layer-2 route, and
   iii) a first performance characteristic of the telecommunications network; generating, by the data-processing system,
   i) a first non-empty set of one or more layer-0 node locations that are identified in the first description, based on a distance of one or more layer-0 node locations from a first predetermined layer-2 node identified in the second description, and
   ii) a second non-empty set of one or more layer-0 node locations that are identified in the first description, based on a given minimum distance of the one or more layer-0 node locations from a second predetermined layer-2 node identified in the second description;
   generating, by the data-processing system, one or more alternatives to the existing layer-2 route, wherein each of the one or more alternatives comprises a unique combination of
   i) a potential layer-2 node selected from the one or more layer-0 node locations in the first non-empty set and
   ii) a potential layer-2 node selected from the one or more layer-0 node locations in the second non-empty set;
   generating, by the data-processing system, an optimal layer-0 routing for each of the one or more alternatives, according to a first objective that is based on the first performance characteristic; and
   routing one or more packets according to the optimal layer-0 routing for one of the one or more alternatives generated by the data-processing system.

10. The method of claim 9 wherein the first performance characteristic considers latency through at least some of the one or more layer-0 route segments, wherein the first objective is to minimize overall latency through a given alternative of the one or more alternatives.

11. The method of claim 9 wherein the first performance characteristic considers unavailability through at least some of the one or more layer-0 route segments, wherein the first objective is to minimize overall unavailability through a given alternative of the one or more alternatives.

12. The method of claim 9 wherein the generating of the one or more alternatives to the existing layer-2 route is based on a plurality of services provided across the existing layer-2 route, wherein each of the one or more alternatives is based on service availability for each service in the plurality.

13. The method of claim 9 further comprising selecting an alternative from amongst the one or more alternatives, based on service availability of the optimal layer-0 routing of each of the one or more alternatives, wherein the routing is in accordance with the alternative.

14. A method comprising: receiving, by a data-processing system,
  i) a first description of a layer-0 network topology of a telecommunications network, comprising one or more layer-0 route segments,
  ii) a second description of an existing layer-2 network topology of the telecommunications network, comprising an existing layer-2 route, and
  iii) a first performance characteristic of the telecommunications network; generating, by the data-processing system, a first non-empty set of one or more layer-0 node locations that are identified in the first description;
  removing, by the data-processing system, one or more layer-0 node locations from the first non-empty set of one or more layer-0 node locations based on a distance of a layer-0 node location from a first predetermined layer-2 node that is identified in the second description to generate a second non-empty set of one or more layer-0 node locations:
  generating, by the data-processing system, one or more alternatives to the existing layer-2 route, wherein each of the one or more alternatives comprises a different potential layer-2 node selected from the one or more layer-0 node locations in the second non-empty set;
  generating, by the data-processing system, an optimal layer-0 routing for each of the one or more alternatives, according to a first objective that is based on the first performance characteristic;
  selecting, by the data-processing system, an alternative from amongst the one or more alternatives, based on service availability of the optimal layer-0 routing of each of the one or more alternatives; and
  transmitting, by the data-processing system, an identification of the potential layer-2 node that corresponds to the optimal layer-0 routing for the alternative selected.

15. The method of claim 14 wherein the first performance characteristic considers latency through at least some of the one or more layer-0 route segments, wherein the first objective is to minimize overall latency through a given alternative of the one or more alternatives.

16. The method of claim 14 wherein the first performance characteristic considers unavailability through at least some of the one or more layer-0 route segments, wherein the first objective is to minimize overall unavailability through a given alternative of the one or more alternatives.

17. The method of claim 14 wherein the generating of the one or more alternatives to the existing layer-2 route is based on a plurality of services provided across the existing layer-2 route, wherein each of the one or more alternatives is based on service availability for each service in the plurality.

* * * * *